Patent Number: 6,035,082
Date of Patent: Mar. 7, 2000

United States Patent [19]
Murphy et al.

[54] PROCESS FOR PREPARING AN OPTICAL FIBER SENSOR WITH ENHANCED SENSITIVITY

[75] Inventors: Kent A. Murphy, Troutville; Mark E. Jones, Blacksburg, both of Va.

[73] Assignee: Luna Innovations, Inc., Blacksburg, Va.

[21] Appl. No.: 09/039,688

[22] Filed: Mar. 16, 1998

[51] Int. Cl.[7] .................................................. G02B 6/34
[52] U.S. Cl. .............................................. 385/37; 385/12
[58] Field of Search .............................. 385/37.31, 12.13

[56] References Cited

U.S. PATENT DOCUMENTS

| | | |
|---|---|---|
| 4,691,991 | 9/1987 | Unger .................................... 385/127 |
| 5,641,956 | 6/1997 | Vengsarkar et al. . |

OTHER PUBLICATIONS

Byeong Ha Lee, Yu Lee, Sang Bae Lee, Sang Sam Choi, Joo Nyung Jang, "Displacements of the Resonant Peaks of a Long–Period Fiber Grating Induced by a Change of Ambient Refractive Index," *Optics Letters*, Jul. 23, 1997, pp. 1769–1771, vol. 22, No. 23, Optical Society of America, U.S.A.

Ashish M. Vengsarkar, Paul J. Lemaire, Justing B. Judkins, Vikram Bhatia, Turan Erdogan, J.E. Sipe, "Long–Period Fiber Gratings as Band–Rejection Filters," *Journal of Lightwave Technology*, Jan. 1996, pp. 58–65, vol. 14, No. 1, IEEE, U.S.A.

A.M. Vengsarkar, P.J. Lemaire, G. Jacobovitz–Veselka, J.B. Judkins, V. Bhatia, T. Erdogan, J.E. Sipe, "Long–Period Cladding–Mode–Coupled Fiber Gratings: Properties and Applications," *1995 Technical Digest Series*, Sep. 9–11, 1995, pp. SaB2–1–SaB2–4, vol. 22, Optical Society of America, Portland, Oregon.

Alan D. Kersey, Michael A. Davis, Heather J. Patrick, Michel Leblanc, K.P. Koo, C.G. Askins, M.A. Putnam, E. Joseph Friebele, "Fiber Grating Sensors," *Journal of Lightwave Technology*, May 5, 1997, pp. 1442,1455–1457, vol. 15, No. 8, IEEE, U.S.A.

Vikram Bhatia, David K. Campbell, Daniel Sherr, Tiffanie G. D'Alberto, Noel A. Zabaronick, Gregory A. Ten Eyck, Kent A. Murphy, Richard O. Claus, "Temperature–Insensitive and Strain–Insensitive Long–Period Grating Sensors for Smart Structures," *Optical Engineering*, Feb. 18, 1997, vol. 26, No. 7, Society of Photo–Optical Instrumentation Engineers, U.S.A.

Zheng Zhang, James S. Sirkis, "Temperature–Compensated Long Period Grating Chemical Sensor," *Technical Digest Series*, Oct. 28–31, 1997, pp. 294–297, vol. 16, Optical Society of America, U.S.A.

H.Y. Tam, W.Du, "Simple Method for Enhancing Fiber Grating's Bragg Wavelength Shift," *SPIE*, Oct. 11, 1996, pp. 300–304, vol. 2895.

*Primary Examiner*—John D. Lee
*Assistant Examiner*—Ellen E. Kang
*Attorney, Agent, or Firm*—Joy L. Bryant

[57] ABSTRACT

A process for preparing an optical fiber having at least one long period grating with enhanced sensitivity is provided. A length of optical fiber having a refractive index profile is provided. The optical fiber supports a core mode and cladding modes for a range of operational wavelengths. Group indices are identified for the core mode and the cladding modes for a specific wavelength wherein the group indices are equal to each other. A long period grating is written in the optical fiber. The long period grating has a grating defined by the group indices and it couples light from the core mode to a cladding mode proximate to where the group indices are equal. The optical fibers prepared by the present invention may be used for measuring an environmental perturbation where high sensitivity is required.

15 Claims, 5 Drawing Sheets

PROCESS FOR PREPARING AN OPTICAL FIBER SENSOR WITH ENHANCED SENSITIVITY

FIELD OF THE INVENTION

This application relates to processes for preparing optical fibers having long period gratings. In particular, it relates to a process for preparing optical fibers having at least one long period grating with enhanced sensitivity.

BACKGROUND OF THE INVENTION

Recently, researchers have begun to use long period gratings (LPGs) to measure refractive index changes. The principle of operation of a LPG is based on the phase-matching condition between the guided and cladding modes in an optical waveguide. Light launched in the waveguide core interacts with the LPG, a periodic refractive index modulation in the fiber core, and is converted into a number of modes contained within the waveguide cladding. The light that is coupled from the core to the cladding is spectrally dependent upon the fiber, grating parameters, and the surrounding environment. As the refractive index changes around the optical fiber, the coupling wavelength changes and a spectral shift can be observed to determine the refractive index.

Observation of the coupling wavelength spectral location is generally performed using static spectral filters, dynamic spectral filters, or optical spectrum analyzers to simultaneously observe the entire spectrum. In each case, enhanced sensitivity is achieved by the measurement system if the LPG coupling wavelength has a greater response to refractive index. Furthermore, increased performance of the LPG sensing element can lead to simplified electronics that do not require high resolution components.

In LPG sensors, the coupling wavelength is dependent upon the refractive index of the fundamental mode, the periodicity of the LPG sensing element, and the effective index of the coupled mode. The effective index is determined by the refractive indices of all the materials through which the mode propagates. For example, in an optical fiber, light contained within a cladding mode propagates with most of the energy contained inside the fiber. However, an evanescent field exists which decays exponentially outside the fiber. The effective index of this mode is approximately the ratio of the two refractive indices and is relative to the energy distribution of the mode. Previously, LPG sensitivity to refractive index was increased by coupling into higher-order modes. These modes have a larger evanescent field outside the fiber so changes in the external refractive index have a greater effect on the effective index of the coupled cladding mode. As a result, a larger wavelength shift was obtained.

However, coupling into higher-order modes has limitations. First, coupling to higher order modes depends on the modal overlap between the fundamental mode and the cladding mode. Each mode has an energy distribution and for modal coupling to occur, there must be an overlap of this energy distribution. For higher order modes, this overlap with the fundamental mode is reduced. Therefore, to couple light into these modes better coupling conditions are required which are sometimes difficult to obtain. Furthermore, coupling into higher-order modes does not necessarily increase the sensitivity.

An object of the present invention is to enhance the sensitivity of an optical fiber having at least one long period grating by balancing the physical parameters in the optical fiber.

Another object of the invention is to provide a process for preparing an optical fiber having at least one long period grating with enhanced sensitivity by balancing the propagation characteristics of the fundamental and coupled modes.

Another object of the invention is to provide a process for measuring an environmental perturbation using an optical fiber having at least one long period grating with enhanced sensitivity.

SUMMARY OF THE INVENTION

The aforementioned objects were achieved by the present invention wherein a process for preparing an optical fiber having at least one long period grating with enhanced sensitivity is provided. The process comprises several steps. First, a length of optical fiber having a refractive index profile is provided. The optical fiber supports a core mode and cladding modes for a range of operational wavelengths. Group indices for the core mode and the cladding modes are identified for a specific wavelength wherein the group indices are equal to each other. A long period grating having a period defined by the group indices is written in the optical fiber. The long period grating couples light from the core mode to a cladding mode proximate to where the group indices are equal. The optical fibers resulting from this process have long period gratings with enhanced sensitivity making them useful as sensors for measuring changes in chemical and biological systems where a high degree of sensitivity is required.

The optical fiber having at least one long period grating with enhanced sensitivity may be used to measure an environmental perturbation. The optical fiber having at least one long period grating with enhanced sensitivity has two coupling points into a single cladding mode. Each coupling point has a specific wavelength. When the optical fiber is exposed to a perturbation in an environment, the exposure causes a change in the wavelength of each coupling point. The separation difference in the wavelengths of each coupling point are measured indicating the degree to which the environment has changed.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF PREFERRED EMBODIMENTS

Optical fibers having at least one long period grating with enhanced sensitivity offer several advantages over those of the prior art. In particular, higher order modes are not required to increase refractive index sensitivity. In addition, enhanced sensitivity is achieved without over-broadening the spectral signal.

Figure 1:
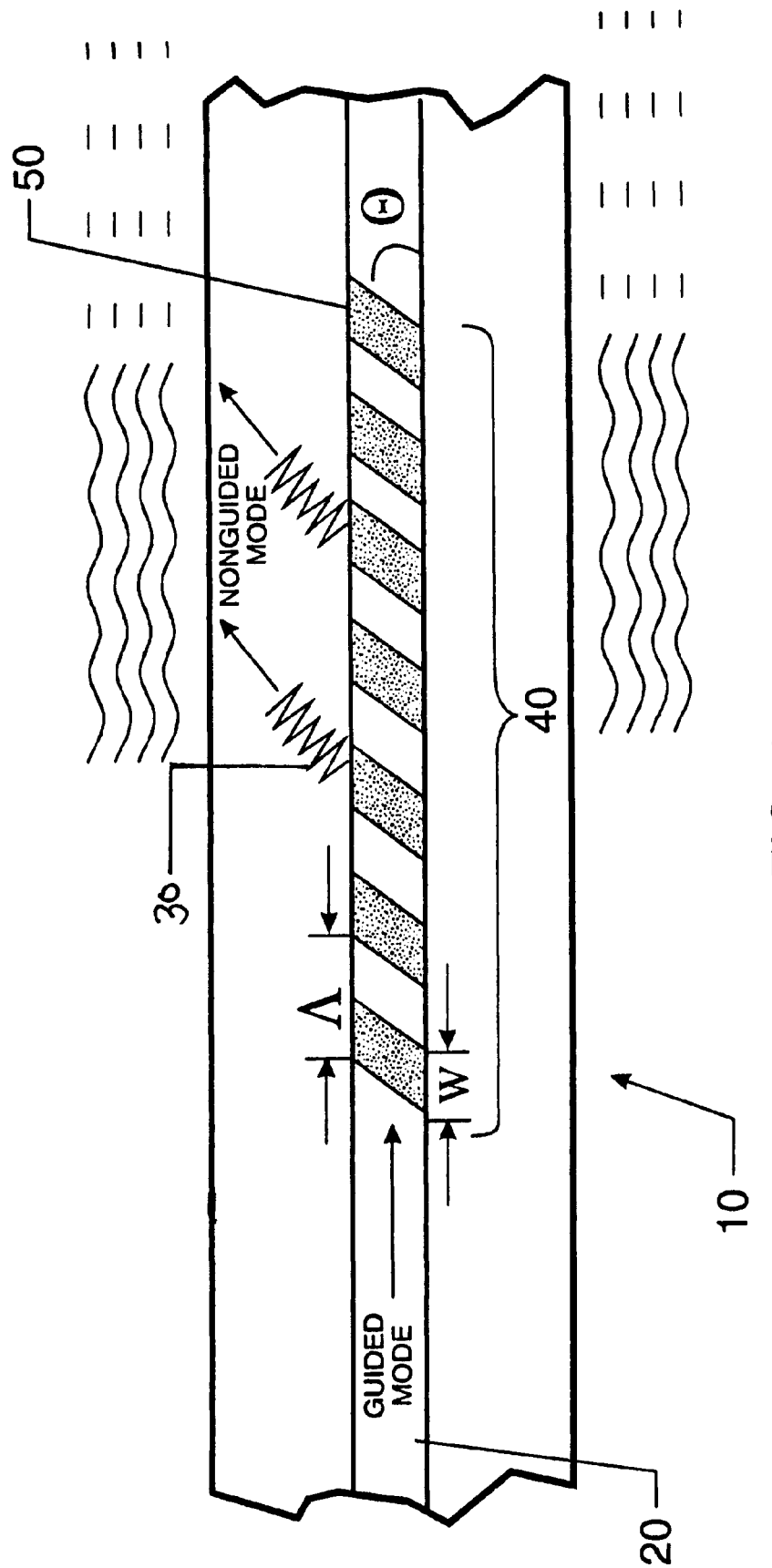
FIG. 1 is a cross-sectional view of an optical fiber having a long period grating disposed therein.

Referring now to the figures where similar elements are numbered identically, FIG. 1 depicts an optical fiber 10 having a long period grating 40 disposed therein. The optical fiber 10 supports a core mode 20 and cladding modes 30 for a range of operational wavelengths. The long period grating 40 comprises a plurality of index perturbations 50 of width w spaced apart by a periodic distance Λ. The perturbations are formed within the core 20 of the fiber 10 and preferably form an angle θ with the longitudinal axis of the fiber 10. The spacing Λ of the perturbations is chosen to shift transmitted light in the region of at least one wavelength from the core mode into the cladding modes thereby reducing in intensity a band of light centered about a plurality of coupling wavelengths.

When preparing the optical fiber of the present invention, a length of optical fiber having a refractive index profile is provided. The optical fiber supports a core mode and cladding modes for a range of operational wavelengths. Examples of the operational wavelengths include but are not limited to: 830±50 nm., 1300±50 nm, 1530±50 nm. Group indices are identified for the core mode and the cladding modes for a specific wavelength and are equal to each other. One way the group indices are identified is by calculating effective indices of the core mode and the cladding modes at the operational wavelengths or the wavelengths at which one desires to operate. The effective indices are calculated based on the standard wave equation for light propagating in a cylinder. This equation is expressed as:

$$(\delta^2 E)/(\delta r^2)+(1/r)(\delta E/\delta r)-(v^2/r^2)E+(k^2-k_{cl}^2)E=(\beta^2-k_{cl}^2)E$$

where:
- E=electric field
- r=radius
- v=mode number
- $k=(2\pi n_{core})$/wavelength, where $n_{core}$ is the refractive index of the core.
- $k_{cl}=(2\pi n_{cladding})$/wavelength, where $n_{cladding}$ is the refractive index of the cladding
- $\beta=(2\pi n_{fund}, n_{eff})$/wavelength, where $n_{fund}$ is the refractive index of the fundamental mode in the core and $n_{eff}$ is the refractive index of the cladding mode that light is coupled into.

Figure 2:
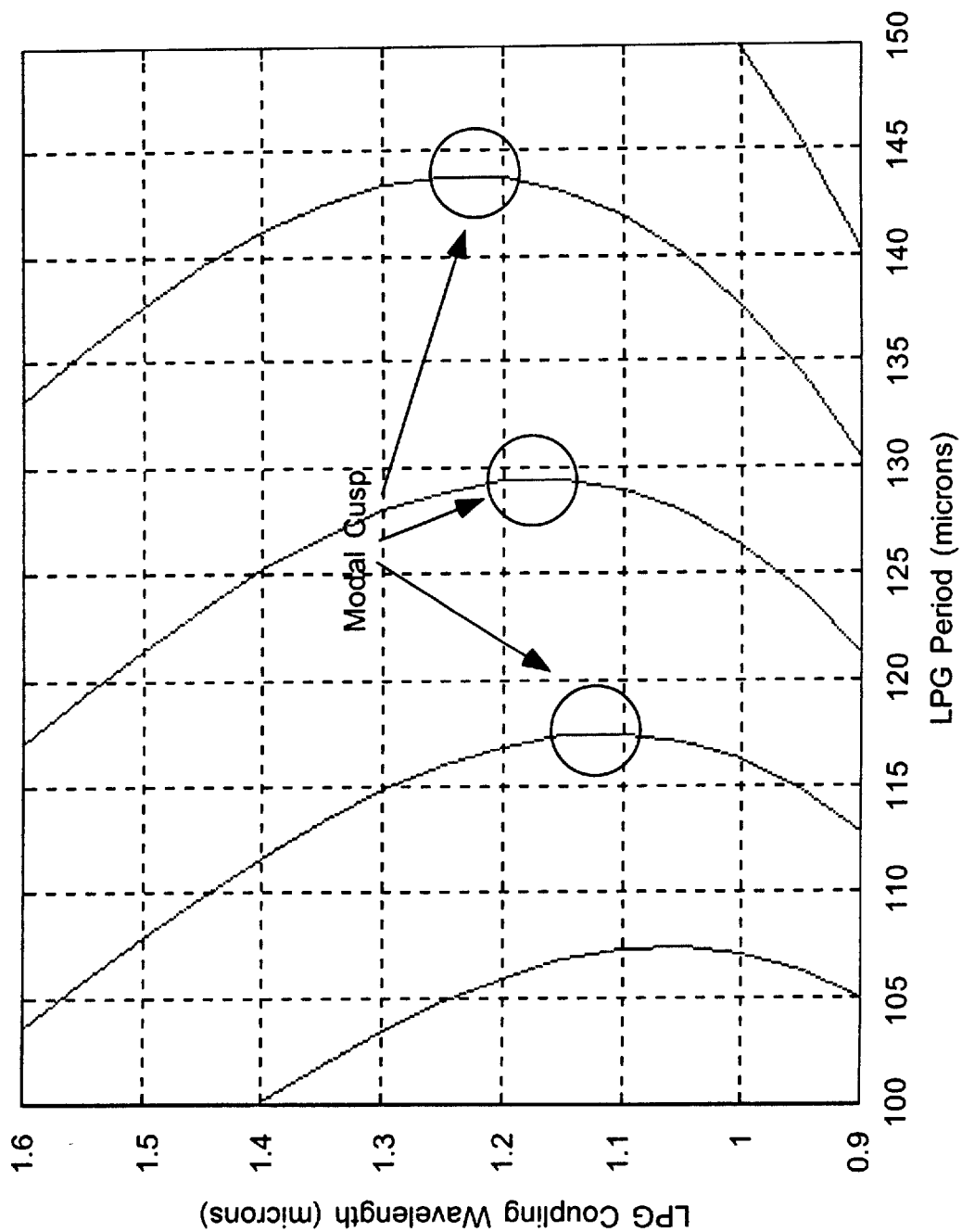
FIG. 2 is a plot showing an example of a characteristic modal curve.

The equation is solved for $n_{fund}$, $n_{eff}$ for core and cladding modes using finite element methods to obtain discrete solutions. Once a value for $n_{eff}$ is obtained, the value is inserted into the phase match equation:

$$(\lambda/(n_{fund}-n_{eff}))=\Lambda$$

where:
- λ=operational wavelength
- $n_{fund}$=refractive index of the fundamental core mode
- $n_{eff}$=effective index of the cladding mode that light couples into.
- Λ=period for the long period grating Characteristic modal curves are generated by plotting wavelength of light passing through the optical fiber versus grating period for the long period grating. An example of the characteristic modal curves is shown in FIG. 2. The figure has curves representing individual cladding modes in an optical fiber. Lower order modes that have light more closely confined to the cladding are to the right while higher order modes are to the left. To use this chart, the desired wavelength is obtained from the y-axis. The modal cusp is identified by the change in the slope. The modal cusp is defined as the point in the characteristic modal curve where the slope changes sign (e.g.—positive to negative). Drawing a horizontal line from the wavelength will intersect one of the modal curves, a vertical line down to the LPG period indicates what period to fabricate the LPG.

To solve the aforementioned equations, different parameters need to be known. For example, the effective indices of the core mode and the cladding modes are calculated based on the optical fiber geometry; core and cladding refractive indices of the optical fiber; core and cladding diameter of the optical fiber; and wavelength of coupled light passing through the optical fiber. In addition, the operational wavelength of the fiber and the operational sensitivity of the fiber must be determined. A refractive index profile can be designed to obtain the desired group indices of the core mode and the cladding modes.

In an alternative embodiment, the group indices are identified by calculating the effective indices of the core mode and the cladding modes at the operational wavelengths. The group indices are calculated based on the effective indices. Lastly, a determination is made as to whether the group indices are equal.

In a preferred embodiment, an optical fiber having at least one long period grating with enhanced sensitivity is prepared by the following process. A length of optical fiber having a refractive index profile is provided. The optical fiber supports a core mode and cladding modes for a range of operational wavelengths. Effective indices of the core mode and the cladding modes are calculated based on the standard wave equation for light propagating in a cylinder. A phase match condition of a long period grating is calculated using the phase match equation. Characteristic modal curves are generated by plotting wavelength of light passing through the optical fiber verses grating period. A modal cusp is identified by the change in the sign of the slope in the plot. A long period grating is written in the optical fiber. The long period grating has a period defined by the group indices. The long period grating couples light from the core mode to a cladding mode proximate to where the group indices are equal. Proximate is defined as about 1 to about 10 microns away from the matched group index condition as defined by the LPG period.

Figure 3:
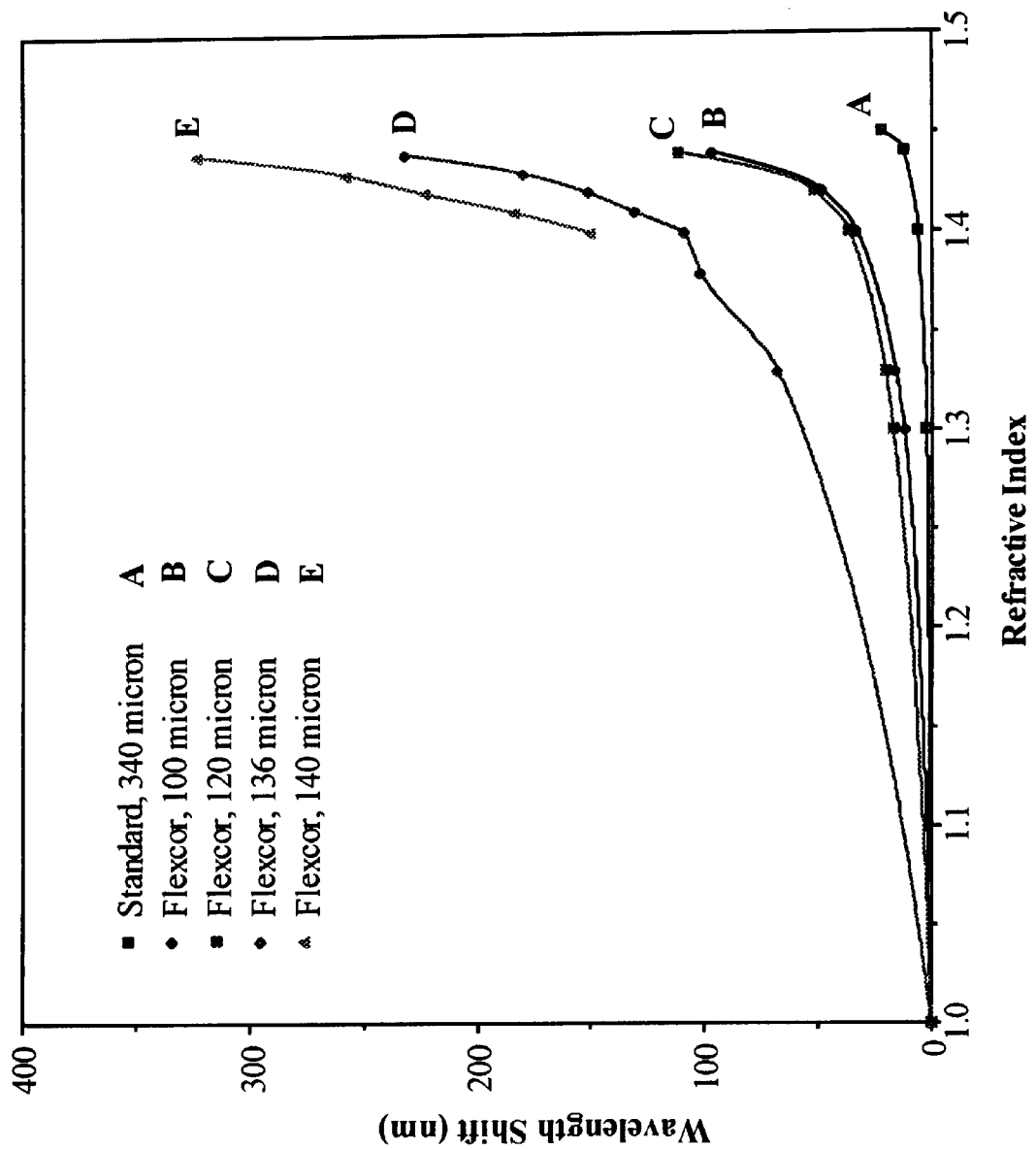
FIG. 3 is a plot showing how the refractive index sensitivity improves by operating proximate to the modal cusp.

The optical fibers prepared according to this process have enhanced sensitivity in comparison to the optical fibers of the prior art. FIG. 3 shows how the refractive index sensitivity improves by operating proximate to the modal cusp. The long period grating shifts as a function of the refractive index. As the slope of each curve increases, the operating point is closer to the modal cusp. Curve A depicts the sensitivity for an optical fiber having a long period grating that is not written near the modal cusp. Note that the shift in wavelength is not very significant. Curve B, shows what happens when a different fiber is used and an LPG is written that has a period closer to the modal cusp. Note that the sensitivity is better than A. Curve C, shows the result of changing the coupling into a different cladding mode. The fiber is the same as B. The LPG period was written at the same distance from the modal cusp as for B but using a different mode. Note that there is no significant difference between B and C. Curve D shows what happens when the made is changed to a different cladding mode from that for C. In this instance the fiber for D is the same as C. The cladding mode was changed to a lower mode in expectation of decreasing the sensitivity. However, when the fiber was tested, it was found that the sensitivity increased. This result was totally unexpected. In curve A, it was found that writing the LPG closer to the modal cusp and operating in a lower mode resulted in a significant increase in sensitivity, which was totally unexpected. Therefore, the optical fibers of the present invention do not require the use of higher order modes to increase the refractive index sensitivity. Although, no curve is shown, it was found that writing the LPG on the modal cusp provided unsatisfactory results.

The optical fibers having at least one long period grating with enhanced sensitivity are used for measuring an environmental perturbation such as temperature, strain, shape, corrosion, pressure, and refractive index. In particular, they may be used to measure changes in refractive index. The optical fiber having at least one long period grating with enhanced sensitivity has two coupling points into a single cladding mode. Each coupling point has a specific wavelength. When the optical fiber is exposed to a perturbation in the environment, the exposure causes a change in the wavelength of each coupling point. The separation difference in the wavelengths of each coupling point are measured to determine whether an environmental perturbation has occurred.

Figure 4:
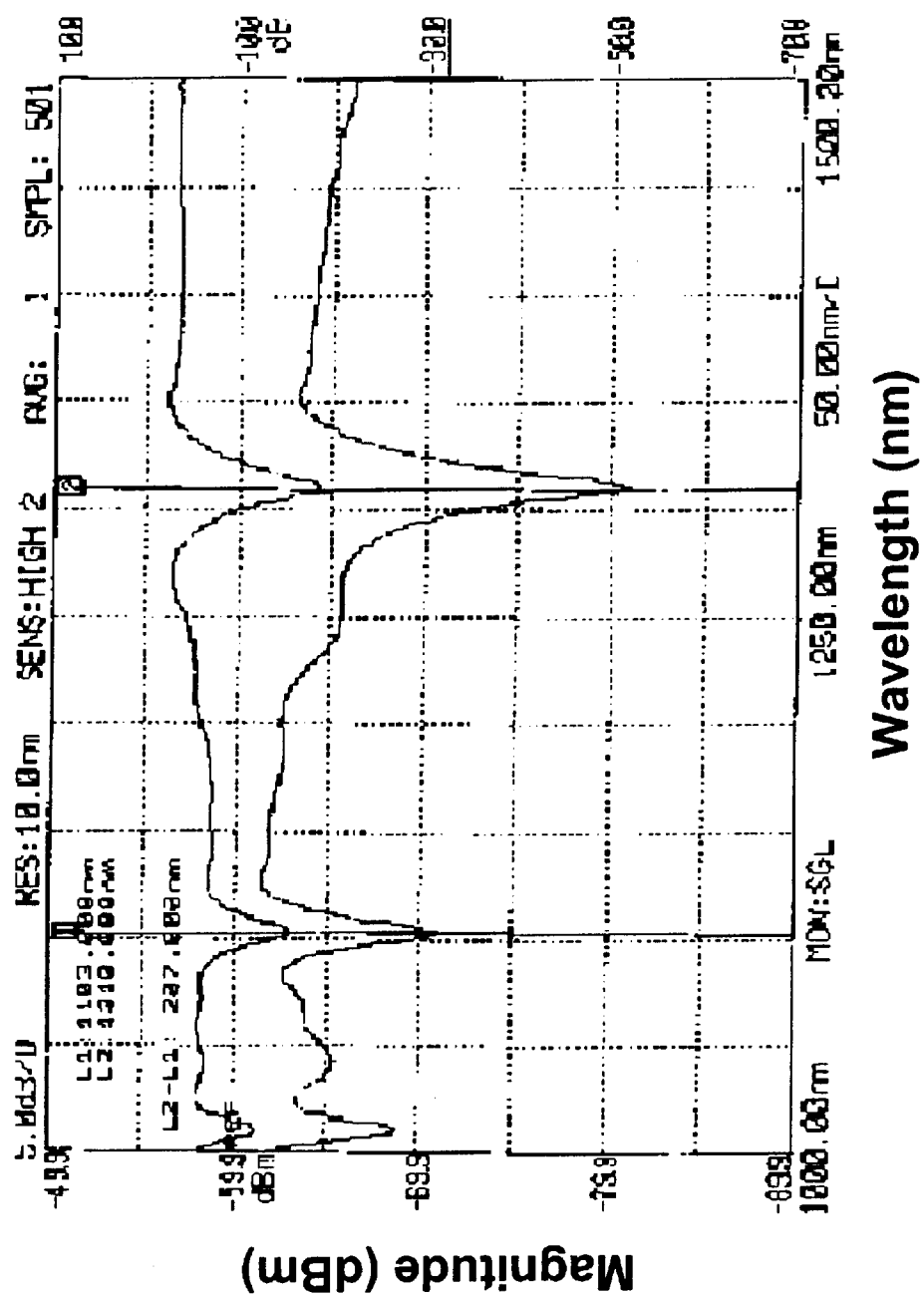
FIG. 4 is spectral profile for a long period grating of the present invention.

In particular, the refractive index is measured by providing an optical fiber having at least one long period grating with enhanced sensitivity having two coupling points into a single cladding mode, wherein each coupling point has a specific wavelength. This is shown in FIG. 4 where there are two peaks in the spectral profile. The optical fiber is exposed to a refractive index change, wherein the exposure causes a change in the wavelength of each coupling point. When the exposure takes place, the peaks move away from each other causing a separation difference in the wavelengths to occur. The separation difference in the wavelengths of each coupling point are measured. The advantage to this method of measurement is that small changes in refractive index may be sensed because of the presence of two distinct peaks.

EXAMPLES

Example 1

A LPG sensor with enhanced sensitivity was constructed. A 2 meter piece of Flexcor™ fiber with a 1060 nm cutoff, commercially available from Corning, was placed in a chamber with a pure hydrogen environment. The pressure inside the chamber was 2000 psi and the fiber was exposed for three days to allow hydrogen to diffuse into it. The acrylate jacket of the fiber was stripped off by submerging a 1 inch fiber section (at the center of the fiber) in methylene chloride and then stripping the remaining jacket by rubbing the fiber with acetone and a laboratory wipe. The fiber was then placed in fiber chucks to hold the optical fiber taut up against an amplitude mask.

The period of the amplitude mask was 136 microns. This period was chosen based on the desire to operate at 1500 nm. Using the wave equation:

$$(\delta^2 E)/(\delta r^2)+(1/r)(\delta E/\delta r)-(v^2/r^2)E+(k^2-k_{cl}^2)E=(\beta^2-k_{cl}^2)E$$

where:

E=electric field r=radius v=mode number k=$(2\pi n_{core})$/wavelength, where $n_{core}$ is the refractive index of the core.

$k_{cl}$=$(2\pi n_{cladding})$/wavelength, where $n_{cladding}$ is the refractive index of the cladding β=$(2\pi n_{fund}, n_{eff})$/wavelength, where $n_{fund}$ is the refractive index of the fundamental mode in the core and $n_{eff}$ is the refractive index of the cladding mode that light is coupled into.

$n_{fund}$ was solved based on the following conditions:

core radius=2.5 microns fiber index delta=0.45

The refractive index of the cladding was calculated using sellmeier coefficients and the fact that the cladding was made from fused silica.

$n_{cladding}$ was calculated for circularly symmetric modes using a core radius of 62.5 microns. Core refractive index was for fused silica and calculated using sellmeier coefficients. Cladding refractive index was assumed to be 1.0 for air. Once the effective refractive indices were known, the phase match equation:

$$(\lambda/(n_{fund}-n_{eff}))=\Delta$$

where:

λ=operational wavelength $n_{fund}$=refractive index of the fundamental core mode $n_{eff}$=effective index of the cladding mode that light couples into.

Δ=period for the long period grating was used to generate the curves as shown in FIG. 2. The cladding mode that light is coupled into is the $LP_{0,14}$ mode and was chosen so that the LPG operating wavelength would be 1500 nm.

To write the LPG into the fiber, the amplitude mask was then exposed using a frequency doubled argon laser that produces UV light at 244 nm with a power of 110 mW. The approximate size of the beam was 1 mm and this beam was propagated through a cylindrical lens to focus the light through an amplitude mask onto the optical fiber. Using a screw and DC motor, the beam was walked along the amplitude mask at a rate of 1 cm/30 min. Exposure of the fiber occurred for 30 minutes. The fiber was then annealed overnight in an oven at 150 C. for 15 hours and then allowed to cool to room temperature.

Example 2

Figure 5:
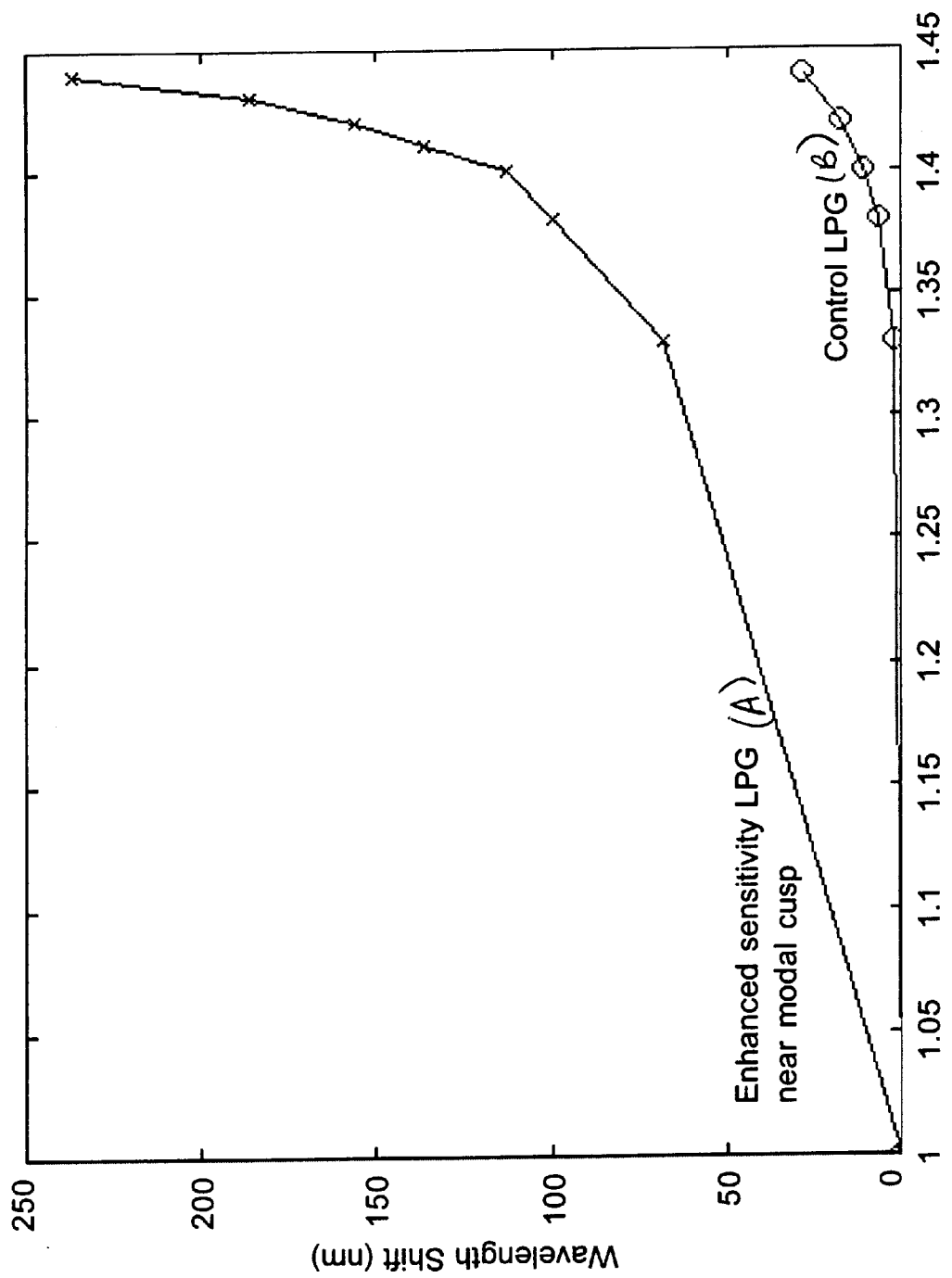
FIG. 5 is a plot showing a comparison of an optical fiber sensor having an LPG written in it proximate to the modal cusp and an optical fiber sensor having an LPG that is not written proximate to the modal cusp when tested for a range of refractive indices.

The fiber prepared in Example 1 was tested by coupling one end of the fiber to a white light source containing a light bulb. This source produced a uniform power spectral density from 1300 nm to 1700 nm. The other end of the optical fiber was inserted into an optical spectrum analyzer and the output was plotted as a function of power versus wavelength. Using a bottom search routine, the location of the LPG coupling point was measured. The LPG was then stretched rigid over a microscope slide. The microscope slide was on a positioner that could be raised and lowered. Calibrated refractive index liquids were placed individually on the microscope slide which was raised until the LPG was submerged in the liquid. The bottom search algorithm was then used to determine the new spectral location of the LPG coupling point. This procedure was performed for a range of liquids with the results shown in FIG. 5. Curve A shows the fiber prepared in Example 1 where curve B is a control that does not have the LPG written near the modal cusp. Curve A shows that as the fiber was exposed to different refractive indices, it underwent a greater wavelength shift than that of the control shown as curve B.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A process for preparing an optical fiber having at least one long period grating with enhanced sensitivity, the process comprising the steps of:
   a) providing a length of optical fiber having a refractive index profile, and wherein the optical fiber supports a core mode and cladding modes for a range of operational wavelengths;
   b) identifying group indices for the core mode and the cladding modes for a specific wavelength wherein the group indices are equal to each other; and
   c) writing a long period grating in the optical fiber wherein the long period grating has a period defined by the group indices and wherein the long period grating couples light from the core mode to a cladding mode proximate to where the group indices are equal.

2. A process according to claim 1, wherein the group indices are identified by:
   a) calculating effective indices of the core mode and the cladding modes at the operational wavelengths;
   b) calculating a phase match condition of a long period grating;
   c) generating characteristic modal curves; and
   d) identifying a modal cusp.

3. A process according to claim 2, wherein the effective indices of the core mode and the cladding modes are calculated based on:
   a) optical fiber geometry;
   b) core and cladding refractive indices of the optical fiber;
   c) core and cladding diameter of the optical fiber; and
   d) wavelength of coupled light passing through the optical fiber.

4. A process according to claim 2, wherein the modal cusp is identified by plotting wavelength of light passing through the optical fiber versus grating period and identifying a change in slope of the plot.

5. An optical fiber having at least one long period grating with enhanced sensitivity prepared by the process according to claim 4.

6. A process according to claim 2, further comprising the steps of:
   a) determining the operational wavelength of the fiber;
   b) determining the operational sensitivity of the fiber; and
   c) designing a refractive index profile to obtain group indices of the core mode and the cladding modes.

7. A process according to claim 6, wherein the effective indices of the core mode and the cladding modes are calculated based on:
   a) optical fiber geometry;
   b) core and cladding refractive indices of the optical fiber;
   c) core and cladding diameter of the optical fiber; and
   d) wavelength of coupled light passing through the optical fiber.

8. A process according to claim 1, wherein the group indices are identified by:
   a) calculating effective indices of the core mode and the cladding modes at the operational wavelengths;
   b) calculating the group indices based on the effective indices; and
   c) determining whether the group indices are equal.

9. An optical fiber having at least one long period grating with enhanced sensitivity prepared by the process according to claim 1.

10. A process for preparing an optical fiber have at least one long period grating with enhanced sensitivity, the process comprising the steps of:
    a) providing a length of optical fiber having a refractive index profile, and wherein the optical fiber supports a core mode and cladding modes for a range of operational wavelengths;
    b) calculating effective indices of the core mode and the cladding modes;
    c) calculating a phase match condition of a long period grating;
    d) generating characteristic modal curves;
    e) identifying a modal cusp by plotting wavelength of light passing through the optical fiber versus grating period and identifying a change in slope of the plot; and
    f) writing a long period grating in the optical fiber wherein the long period grating has a period defined by the group indices and wherein the long period grating couples light from the core mode to a cladding mode proximate to the modal cusp.

11. An optical fiber having at least one long period grating with enhanced sensitivity prepared by the process according to claim 10.

12. A process for measuring an environmental perturbation, the process comprising the steps of:
    a) providing an optical fiber having at least one long period grating with enhanced sensitivity, each long period grating having a period defined by group indices and having two coupling points into a single cladding mode, wherein each coupling point has a specific wavelength;
    b) exposing the optical fiber to a perturbation in an environment wherein the exposure causes a change in the wavelength of each coupling point; and
    c) measuring a separation difference in the wavelengths of each coupling point.

13. A process according to claim 12, wherein the perturbation in an environment is selected from the group consisting of: temperature, strain, shape, corrosion, pressure, and refractive index.

14. A process according to claim 13, wherein the perturbation in an environment is a refractive index.

15. A process for measuring refractive index, the process comprising the steps of:
    a) providing an optical fiber having at least one long period grating with enhanced sensitivity, each long period grating having a period defined by group indices and having two coupling points into a single cladding mode, wherein each coupling point has a specific wavelength;
    b) exposing the optical fiber to a refractive index change, wherein the exposure causes a change in the wavelength of each coupling point; and
    c) measuring a separation difference in the wavelengths of each coupling point.

* * * * *